_Patented Apr. 1, 1941_ 2,236,662

UNITED STATES PATENT OFFICE 2,236,662

SHOCK ABSORBER AND SIMILAR MECHANISM

Donald L. Wright, Elizabeth, N. J., assignor to Standard Oil Development Company, a corporation of Delaware No Drawing. Application August 31, 1938, Serial No. 227,773

2 Claims. (Cl. 188—88)

This invention relates to improved viscous liquids for use in shock absorbers, dash pots, vibration dampeners, and in similar mechanisms which depend for their successful operation on constancy of resistance to flow through small orifices offered by a viscous liquid under various conditions. More particularly this invention relates to a composition having as a base a petroleum oil which blends with a minor quantity of a viscosity building oil to form a hydraulic medium having satisfactory action in shock absorbers or similar mechanisms through a wide range of temperatures, including extremely low atmospheric temperatures.

Heretofore, hydraulic media, such as glycerine-alcohol blends, castor oil, and synthetic hydrocarbon lubricating oils, have been used and proposed for use in automobile shock absorbers and similar mechanisms, but these substances are inherently expensive and may not be at all times available. There are objections to the use of many liquids for this purpose when economies are practiced, in that such liquids fail to perform their function successfully over a wide range of temperatures and particularly at low atmospheric temperatures. Conventionally manufactured lubricating oils, per se, are not suitable because they lack necessary properties of high viscosity and high viscosity index combined with low pour point, besides those qualities which are difficult to catalogue except by reference to the specific service for which they are to be adapted.

Shock absorbers used on automobile chassis are subject to wide variations of temperature conditions under which they are intended to give uniform performance with infrequent adjustments of their mechanisms. Such shock absorbers are commonly the double acting type which operate on the principle of hydraulic resistance of a liquid forced by pressure through small openings or orifices from one compartment to another by a moving part, such as a piston or a rotating wing, which applies the pressure to the liquid contained in a working chamber. By simple analogy, the double acting shock absorber resists accelerated movement in two ways just as a door check resists sudden closing of a door. In the type using a rotating wing, this wing operates integrally with a lever arm, which may be described as being given an upward stroke when a connected chassis spring is flexed upwardly on a bump and as being given a downward stroke on the rebound. The ability of the shock absorber to regulate the flexing of the chassis spring depends largely on the regularity of the liquid flow through the openings between the compartments at the beginning of the bump and throughout the movements of the lever arm. With a single setting of an adjustment valve intended to control the general action of the shock absorber over a long period of time, the shock absorber operation is judged as giving better riding qualities if the torque resistance of the shock absorber is not much higher on the first bump stroke than on a series of successive bump and rebound strokes, and if the difference in torques at two widely different temperatures is minimized.

An object of the present invention is to provide an economical mineral oil base hydraulic medium which gives the desired uniform compensating resistance under widely varied conditions and at all stages of impulse to the moving parts of a shock absorber mechanism.

A more specific object is to compose a hydraulic medium from a mineral oil and other ingredients which cooperate most advantageously for giving the uniform compensating resistance desired.

For satisfactorily accomplishing the objects of this invention, the mineral oil primarily selected as the base or major ingredient of the hydraulic medium is a petroleum oil having a relatively low viscosity and a low pour point, even though it has a low viscosity temperature coefficient; for example, a light naphthenic base petroleum lubricating oil. By relatively low viscosity is meant: of the order belonging to the class of light lubricating oils commonly used in light machinery and known in the art as spindle oils. An oil with such low quality in viscosity characteristics is not very suitable for motor lubrication and is readily available at low prices. Such an oil when blended with minor quantities of other readily available materials, such as a non-drying thickened fatty oil, forms a blend surprisingly well suited as a hydraulic medium for shock absorbers under normal conditions, and even well suited under unusually low temperatures by a small addition of certain materials which effectively reduce the pour point of the blend.

Preferably, the main ingredient for the blend found by special tests to give required performance in shock absorbing mechanisms is a light petroleum lubricating oil having a viscosity below about 260 Saybolt seconds at 100° F., a low viscosity index, below about 50, and a pour point below about −10° F., which properties in general characterize a naphthenic base oil having a spindle oil viscosity. Spindle oil fractions from Colombian and Coastal Crudes answer the purpose very well. A viscosity building ingredient of such a blend is preferably a readily available viscous oil, imparting to the blend a viscosity of about 1350 to 1450 Saybolt seconds at 100° F. and other desirable viscosity characteristics, without greatly altering the pour point from that of the mineral oil, when added conservatively to the described base oil. The viscosity building ingredient, of course, must have a higher viscosity than the final blend, but should be non-asphaltic.

As the viscosity building ingredient, commercial blown rapeseed oil is particularly suitable, since even in minor proportions this non-drying thickened fatty oil imparts to the blend a suitably high viscosity and a high viscosity index. Viscosity index is a measurement of the viscosity variation of an oil with temperature made according to the method described in the article by Dean and Davis, "Chemical and Metallurgical Engineering" vol. 36, 1929, page 618.

Small concentrations of synthetic pour point depressants, particularly those synthesized by condensations involving chloro-paraffins in the presence of a Friedel-Crafts type catalyst in a manner well known in the art and described in the U. S. patent to G. H. B. Davis, No. 1,815,022, granted July 14, 1931, aid effectively in lowering the pour point of the blended mineral oil and non-drying thickened fatty oil. The chemical composition of the preferred synthetic pour point depressants may be characterized as high molecular weight compounds containing long alkyl group branches. These alkyl groups should have preferably about 8 to 30 carbon atoms in straight chains, and may be joined to other long alkyl groups or to a cyclic group, preferably to a polycyclic group, e. g., a naphthyl or a naphthol group. While these synthetic pour point depressants are known to manifest an action which might be considered as that of inhibiting wax crystal formation, in their use with a mineral oil base hydraulic medium for shock absorbers they must be able to avoid clogging of the orifices or an effect known as rigidity; otherwise, an excessive torque resistance is set up by the shock absorber mechanism to each initial impulse after a rest interval. Any substance which might cause rigidity by gel formation would be undesirable even if such a substance lowered the pour point.

For the sake of illustration, although not desiring to be limited thereby, an example will be given of preferred proportions in which the essential constituents are blended to form an automobile shock absorber oil which provides adequate riding qualities:

Example

A light naphthene base lubricating oil having Saybolt viscosity of 140 to 160 seconds at 100° F., a viscosity index of 30 to 45, and a maximum pour point of −20° F. is blended with a blown rapeseed oil having a pour point of about +15° F., until the blend has a viscosity of about 1400 Saybolt seconds at 100° F. This blend contains blown rapeseed oil in a concentration of 30 to 45% and has a minimum viscosity index of about 95, and a pour point not much above −15° F. This pour point was found to be effectively reduced with satisfactory avoidance of rigidity when a pour point depressant synthesized by the condensation of chloroparaffins with aromatics is added to the blend in a concentration of about 1 to 5%. The following tabulated data show the effects of the pour point depressant on the pour points of these materials blended with a naphthene base lubricating oil.

Pour point table

| Material | Pour point |
| --- | --- |
| | °F. |
| Mineral oil | −20 |
| Blown rapeseed oil | +15 |
| Blend (containing 62% mineral oil and 38% blown rapeseed oil) | About −15 |
| Blend (above referred to) with 2% pour depressant | Below about −20 |

Substantially the same proportions of base oil and viscosity builder indicated in the foregoing example may be used when the base oil has a higher or lower viscosity in the range of about 60 to 260 Saybolt seconds at 100° F. For example, in using a mineral oil base having a viscosity of about 194 Saybolt seconds at 100° F., a blend containing 61% of such mineral oil, 37% of blown rapeseed oil, and 2% of synthetic pour point depressant has a viscosity of 1394 Saybolt seconds at 100° F.

Tests were run on shock absorbers using hydraulic media of various compositions. With the adjustment valves set for satisfactory riding qualities, torque measurements were made in a series of consecutive bump and rebound strokes at very high and low temperatures. A comparison of such data commends the novel composition of this invention for performing in many respects as well as and better than more costly liquids which have been commonly used hitherto.

Although particular compositions with specific ingredients and proportions have been described, the invention is not limited thereto. The invention may also be carried out with other viscous non-drying fatty oils of vegetable or animal origin having qualities similar to those of blown rapeseed oil. Non-drying thickened fatty oils having high viscosities and prepared from cotton seed oil, maize oil, seal oil, and sperm oil by air-blowing or other known methods of thickening, such as catalytic and electrical polymerizing, which reduce the iodine numbers of such oils to below 75, are considered adaptable as substitutes for blown rapeseed oil. These thickened fatty oils are available as the ordinary commercial products obtained by blowing air into the fatty oil with stirring for a period of about 15 to 30 hours at a temperature of about 170° F. until the desired specific gravity or viscosity is reached. Rapeseed oil, for example, would be treated in this manner until its specific gravity is raised from about 0.914 to between about 0.968 and 0.990, determined at 60° F.

For building up the viscosity of the base oil, the non-drying thickened fatty oil may be partly replaced by a relatively small proportion of synthetic viscosity-improving non-asphaltic polymers, for example, by about 0.5 to 10% of isobutylene polymers having molecular weights in the range of about 10,000 to 20,000. In accordance with the present invention, it is preferred to eliminate these polymers.

A viscous non-asphaltic mineral lubricating oil, such as a paraffinic base bright stock, is a more desirable substitute for non-drying thickened fatty oil in building up the viscosity of the mineral oil base.

The description of the aforementioned compositions as being particularly intended for use in shock absorbers, in which the requirements may be exacting for low pour points and constancy of viscosity under widely varying temperature conditions, is not intended to limit the invention entirely to such a use for these compositions. Blends prepared in accordance with this invention are useful for other purposes such as vibration dampeners and various other mechanisms dependent for their operation on the resistance to flow of a viscous fluid with maintained proper fluidity. The proportions of the ingredients in the blends may be varied somewhat, depending on the size of the mechanism, its speed, and particular mode of operation. It is to be noted that while these blends should have some of the desired characteristics of lubricating oils used in automobile engine lubrication, such as a high viscosity index and a low pour point they additionally must have much higher viscosities and other qualities required for satisfactory service in the particular mechanisms described.

While there are above disclosed a limited number of embodiments of the invention, it is possible to produce still other embodiments within the inventive concept herein disclosed, and it is therefore desired that the above specific disclosures be regarded as examples of individual embodiments, and not as limitations upon the scope of the invention.

I claim:

1. A viscous liquid damping mechanism comprising a variable volume chamber, a small orifice cooperating therewith and a liquid filling therein suitable for the production of substantially uniform compensating resistance under varying temperature conditions by a liquid flow through said small orifice, comprising a major proportion of a light petroleum lubricating oil having a pour point below about −10° F., and a sufficient quantity of thickened rapeseed oil having an iodine number below 75 to give the blend a viscosity in the range of about 1350 to 1450 Saybolt seconds at 100° F.

2. A viscous liquid shock absorber comprising a variable volume chamber, a small orifice cooperating therewith and a filling liquid therein for operation at substantially constant resistance to flow through said orifice at various operating temperatures comprising a major proportion of petroleum lubricating oil, having a viscosity below about 260 Saybolt seconds at 100° F., a pour point below −10° F., and a viscosity index below about 50, blended with a sufficient quantity of thickened rapeseed oil to impart to the blend a viscosity in the range of 1350 to 1450 Saybolt seconds at 100° F.

DONALD L. WRIGHT.